(12) United States Patent
Giroux

(10) Patent No.: US 6,289,347 B1
(45) Date of Patent: Sep. 11, 2001

(54) DATA PROCESSING SYSTEM UTILIZING WEB FORMS

(75) Inventor: Michael Giroux, Phoenix, AZ (US)

(73) Assignee: Bull HN Information Systems Inc., Billerica, MA (US)

(*) Notice: Subject to any disclaimer, the term of this patent is extended or adjusted under 35 U.S.C. 154(b) by 0 days.

(21) Appl. No.: 09/208,063

(22) Filed: Dec. 9, 1998

(51) Int. Cl.$^7$ .............................. G06F 17/30; G06F 9/00; G06F 77/00; G06F 13/00

(52) U.S. Cl. ........................ 707/10; 709/203; 709/200; 709/230

(58) Field of Search ............................... 707/10; 709/230, 709/328, 203, 239, 200, 218; 370/352

(56) References Cited

U.S. PATENT DOCUMENTS

| | | | |
|---|---|---|---|
| 5,636,333 | * 6/1997 | Davidson, Jr. et al. | 395/114 |
| 5,987,517 | * 11/1999 | Firth et al. | 709/230 |
| 6,067,579 | * 5/2000 | Hardman et al. | 709/328 |
| 6,073,160 | * 6/2000 | Grantham et al. | 709/200 |
| 6,131,095 | * 10/2000 | Low et al. | 707/10 |

OTHER PUBLICATIONS

Bull HN Information Systems Inc. web 8 Users Guide, Mar. 1998.
Bull HN Information Systems Inc. MainWay Overview, Dec. 1996.

* cited by examiner

*Primary Examiner*—Thomas Black
*Assistant Examiner*—Te Yu Chen
(74) *Attorney, Agent, or Firm*—B. E. Hayden; J. S. Solakian (57) ABSTRACT

A data communications system for supporting World Wide Web (WWW) database queries to enterprise level databases utilizes two server based programs. A first program retrieves and transmits a specified version of a specified form to an intermediate forms program. The second program has two modes of operation. In either mode, database queries to the enterprise level database are performed and results transmitted. However, in a first, standard, mode of operation, a specific version of a specific form is read from a forms database and transmitted to the requester along with the query response. In the second mode of operation, only the database query results are transmitted, along with a modified header that specifies the appropriate form. The corresponding forms are retrieved from a local forms database and merged with the query response before being displayed by a Web browser. Missing forms are requested from the Web forms program and cached for subsequent requests.

31 Claims, 6 Drawing Sheets

```
          ┌ HTTP 1.0 200 OK [NL]
    152 ─┤ content-type: text/html [NL]
          └ [NL]
          ┌ <SCRIPT Language=Java Script> [NL]
          │ var field1="value1" [NL]
    156 ─┤ var field2="value2" [NL]
          │ var field3=New Array("value3","value4") [NL]
          └ </script> [NL]
          ┌ <BODY> [NL]
          │ The result of concatenating field1 and field2 is
          │ <Script Language=Java Script> [NL]
          │ document.write(field1+field2) [NL]
          │ </script> [NL]
    158 ─┤ Same thing using an array for field3:
          │ <Script Language=Java Script> [NL]
          │ document.write(field3[0]+field3[1]) [NL]
          │ </script> [NL]
          └ </body> [NL]
```

FIG. 7

```
          ┌ HTTP 1.0 200 OK [NL]
    154 ─┤ content-type: text/geapform; name=form1 version=86
          └ [NL]
          ┌ <SCRIPT Language=Java Script> [NL]
          │ var field1="value1" [NL]
    156 ─┤ var field2="value2" [NL]
          │ var field3=New Array("value3","value4") [NL]
          └ </script> [NL]
```

FIG. 8

DATA PROCESSING SYSTEM UTILIZING WEB FORMS

CROSS REFERENCE TO RELATED APPLICATION

This application is related to these copending patent applications assigned to assigned hereof:

Application entitled "METHOD FOR IMPROVING PERFORMANCE UTILIZING PARSED HTML": filed: May 13, 1998, with Ser. No.: 09/078,08 and now abandoned, Application entitled "METHOD FOR REDUCING MESSAGE TRANSLATION AND TRAFFIC THROUGH INTERMEDIATE APPLICATIONS AND SYSTEMS IN AN INTERNET APPLICATION": filed: Jun. 3, 1997, with Ser. No.: 08/868,178 now U.S. Pat. No. 6,067,579; and Application entitled "METHOD AND SYSTEM FOR PROVIDING HIGH PERFORMANCE WEB BROWSER AND SERVER COMMUNICATIONS": filed: Oct. 6, 1998, with Ser. No.: 09/166,877.

FIELD OF THE INVENTION

The present invention generally relates to database processing in a data processing system, and more specifically to online transactional database processing of World Wide Web (WWW) queries and responses.

BACKGROUND OF THE INVENTION

A World Wide Web (WWW) site typically consists of a collection of HyperText Markup Language (HTML) documents. HTML is a text language that provides for hyper-linked graphic display. A user of a Web browser utilizing the World Wide Web (WWW) typically requests that a Web server download HTML text to his Web browser. Currently, some popular Web browsers are Netscape Navigator and Microsoft Internet Explorer. The Web browser interprets the downloaded HTML text and generates screen images from the HTML text. The HTML text invariably describes hyperlinked hot spots that cause further downloads when selected.

HTML documents are typically generated by text editors such as Microsoft Word, or by more specialized HTML document editors and are stored as text files in directories on Web servers. By convention, HTML text files have file names that include extensions of either ".HTML" or ".HTM", depending on the operating system. Web servers recognize these file extensions and treat such documents as static byte streams. Static HTML files are typically transmitted verbatim by Web servers to Web browsers, and are thus fairly efficient for the Web servers to process.

One recent application that has gained popularity on the World Wide Web (WWW) is database access. HTML provides an efficient, flexible method of providing a sophisticated user interface to databases. Many WWW access requests are ultimately turned into database accesses. Part of the flexibility of using HTML for this type of application is that user interface changes tend to be fairly easy and do not require the significant programming resources that were required by earlier generations of database interfaces.

To support dynamic or customized Web content, modern commercial Web servers typically recognize additional file types. For example, Microsoft programs recognize files with the extension of ".ASP" indicating that the file is an "Active Server Page" containing various fields that must be analyzed by a Web server. In some instances, these various active or dynamic fields are embedded database requests.

A number of performance problems are introduced into Web servers by supporting active, or dynamic Web documents. One such problem that frequently arises is that having a Web server interpret each HTML command in a dynamic HTML file typically requires a significant amount of computer resources. The present solution to this problem is to replicate the server and database a sufficient number of times necessary to provide required levels of service. Currently, some applications are implemented with databases and database servers replicated upwards of thirty times, with access to the replicated servers provided by sophisticated high speed load leveling routers. While this does work to some extent on databases that are not heavily updated, this approach tends to not work well when the databases need frequent updates. This is because the updates to all of the replicated copies of the database need to be synchronized, which is quite difficult.

The approach works reasonably well for fairly small databases, since the amount of data that needs to be replicated for each database server is fairly small. However, this approach does not scale well. In particular, this approach is currently totally infeasible for enterprise level databases consisting of terabytes of data. One reason for this infeasibility is that large companies often have a hard enough time keeping online access to a single copy of their enterprise level database, given the size of these databases. Replicating the database even a couple of times is not feasible. To this should be added the problems for concurrency problems between database copies that arise any time there are multiple database copies in use and the difficulty of supporting online updates for replicated data.

Another problem that arises is that transmitting entire screens back and forth between Web servers and Web browsers can be expensive in terms of resources, such as processor usage and communications bandwidth. Higher and higher speeds are promised for the Internet and the World Wide Web (WWW). For example, the Regional Bell Operating Companies (RBOCs) are rolling out DSL/ADSL lines capable of megabit transmission rates. Meanwhile, the cable companies are starting to support Internet traffic over their cable systems. However, it seems that the amount of data being transmitted over these communications links is growing at even a higher rate. Also, while end-user speeds are rapidly increasing, backbone speeds are not keeping pace.

One additional problem encountered in high-speed transaction systems utilized as Web browsers is that the HTML hyperlinks typically specify names of files containing HTML documents. These file names are either relative to the current document, or are specified as full UNIX, Window, or Mac type path names. Following these path names works adequately on low volume Web servers and Web browsers. However, it is not uncommon to find in Web servers that more resources are spent opening and closing files than are spent actually interpreting and transmitting the contents of the files.

As databases accessible from the World Wide Web (WWW) increase in size, performance issues become more and more important. There is therefore a need to provide an efficient mechanism for Web servers to process HTML files containing active or dynamic HTML commands. There is also a need to minimize processor cycles and communications bandwidth when transmitting and receiving Web pages. There is also a need to minimize the system overhead generated by opening and closing files in order to evaluate file names in HTTP addresses.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A system of data processing and data communications equipment is disclosed that provides significant performance advantages over the prior art. A host or server system provides database access and as a forms repository for user systems. Intermediate systems maintain libraries of HTML forms. Database requests are made by a user utilizing a standard Web browser. A database query is transmitted to a server system where it is processed. The response to the query is transmitted back to the intermediate system. The intermediate system will then check to see if it currently has the appropriate form matching the query response. If not, the form is requested from the server system. The results of the database query are then combined or merged with the appropriate form to generate a HTML document, which is then transmitted to the Web browser. In some cases, such as for example with remote laptop systems, the intermediate system functionality is incorporated in the same user system that is utilizing the standard Web browser. Note also that the same program on the server can support both optimized database requests where the form is merged on the intermediate system, and standard database requests where the program itself merges the results of a database query with the appropriate form.

Figure 1:
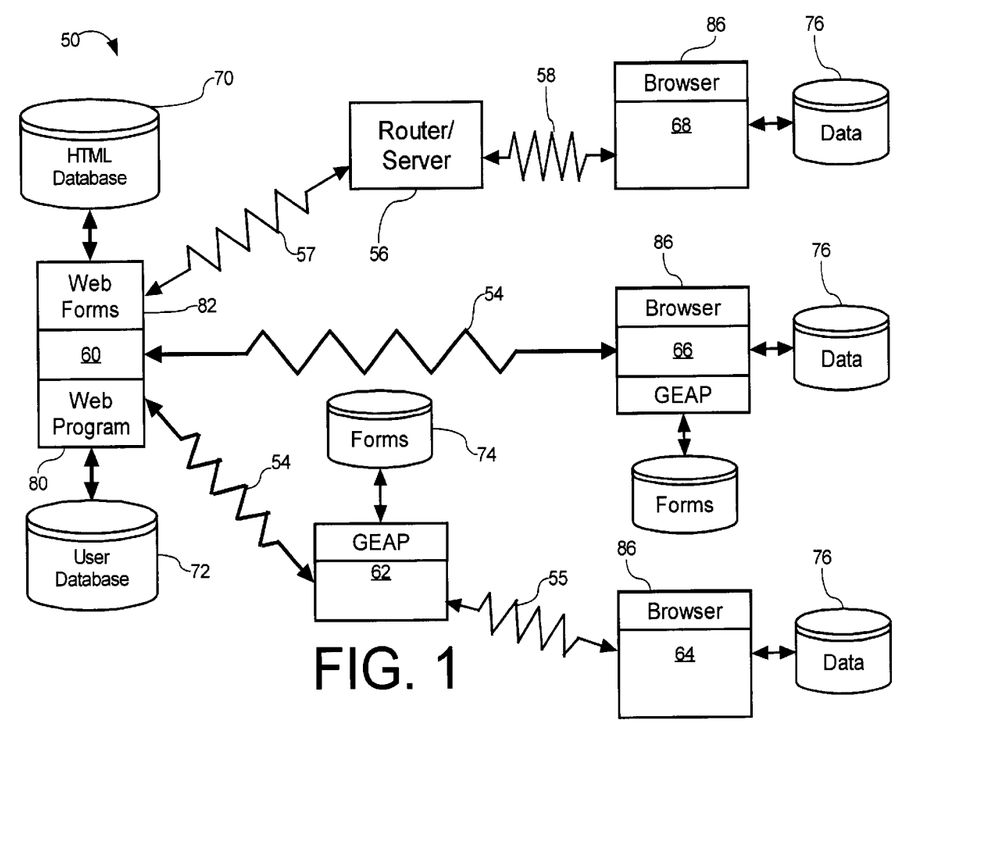
FIG. 1 is a block diagram of a system of data processing and data communications equipment, in accordance with the present invention.

FIG. 1 is a block diagram of a system 50 of data processing and data communications equipment, in accordance with the present invention. A server 60 contains two database applications: a Web forms program 82, and a Web database access program 80. The server 60 is shown coupled to two databases: an enterprise level user database 72, and an HTML template forms database 70. The Web forms program 82 retrieves HTML forms from the HTML template forms database 70 and transmits them upon request. The Web database access program 80 responds to HTTP requests, performs database queries to the enterprise level database 72, and transmits the results, either alone, or combined with a corresponding form from the forms database 70. In the preferred embodiment, both the Web Forms program 82 and the Web database access program 80 execute as transaction processing routines (TPR) utilizing the TP8 transaction processing monitor in the GCOS® 8 operating system available from the assignee of this invention. This provides an extremely high performance system capable of supporting a large number of simultaneous responses. Note that the two server programs 80, 82, are shown executing on a single server 60. This is for illustrative purposes. Alternatively, the two may execute on distinct servers.

Figure 3:
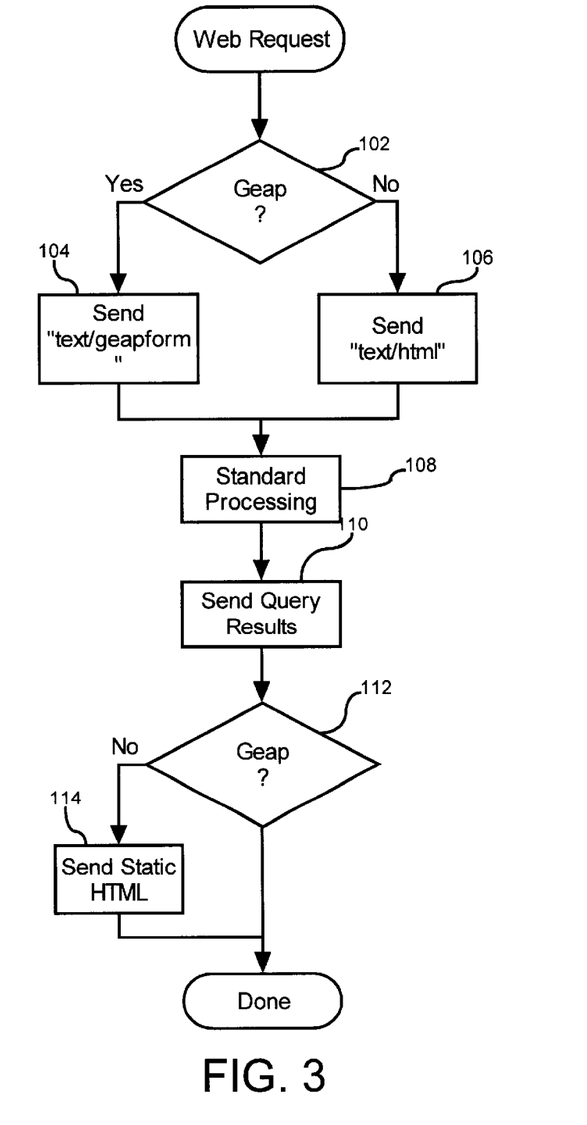
FIG. 3 is a flow chart that illustrates operation of a Web server application executing on the server shown in FIG. 1.

The Web database program 80 supports two different types of requests (see FIG. 3). In the first of these two types of requests, the responses to a database query to the enterprise level database 72 are combined with a corresponding Web form and transmitted to a Web browser 86 for display. Hereinafter, we will term this a "Standard" mode of operation. A merged HTML document is transmitted over communications lines 57, 58 to a user system 68 executing an Internet Web Browser 86. The Internet typically executes utilizing a TCP/IP protocol. This protocol is essentially connectionless. It has long been known that connection, or session, oriented transmissions are much more efficient in high-speed transaction environments. This is because in a connectionless communications environment, it is necessary to determine mappings between ongoing transactions and particular users each time data is transmitted to or received from a user system. It is also necessary to determine session failures. This is typically done through timeouts. Including all of this in the server system can be extremely expensive in terms of resources. For this reason, the mapping between user systems and database transactions can be done in a communications server 56. The database server 60 will then communicate over high speed communications lines 57 or system I/O channels utilizing a session oriented protocol such as DSA (Bull), or SNA (IBM) between the database server 60 and the communications server 56, and then over other communications lines 58 utilizing connectionless TCP/IP protocol with the user system 68 executing the Internet Web Browser 86. Note that the communications router/server 56 can be located either in the vicinity of the database server 60, or remotely. When the communications router/server 56 is located in the vicinity of the database server 60, it may be attached to the database server 60 via a system bus or other form or type of channel. In this case, I/O protocols specific to the Operating System (OS) will typically be used instead of a network protocol such as DSA or SNA.

In response to the second of these two types of requests, the responses to a database query are transmitted alone 54. A GEAP program 84 in either an intermediate system 62, or in a user system 66 executing an Internet Web Browser 86 will merge the database query response with its own copy of the appropriate form, retrieved from its local form file 74. Hereinafter, we will term this a "GEAP" or "Efficient" mode of operation. In the case of the intermediate system 62, the merged form is transmitted over communications lines 55 as an entire HTML document to an end-user system 64 executing an Internet Browser 86. The Internet Web Browser 86 will display the merged HTML document on the user screen in the user systems 64, 66, 68. Database results may also be written to data files 76 connected to these user systems 64, 66, 68. This GEAP or "efficient" mode of operation significantly reduces the amount of bandwidth required to transmit data across the Internet, and significantly reduces the amount of processing required in the server 60 to process requests. This allows for significantly greater throughput compared to the prior art solutions.

Note that in FIG. 1, two different types of communications lines are depicted. Full HTML documents (see FIG. 7) are transmitted over communications lines 55, 57, 58 depicted with a single line. Query responses (see FIG. 8) to a GEAP program 84 are transmitted over transmission lines 54 depicted with a double line.

Figure 2:
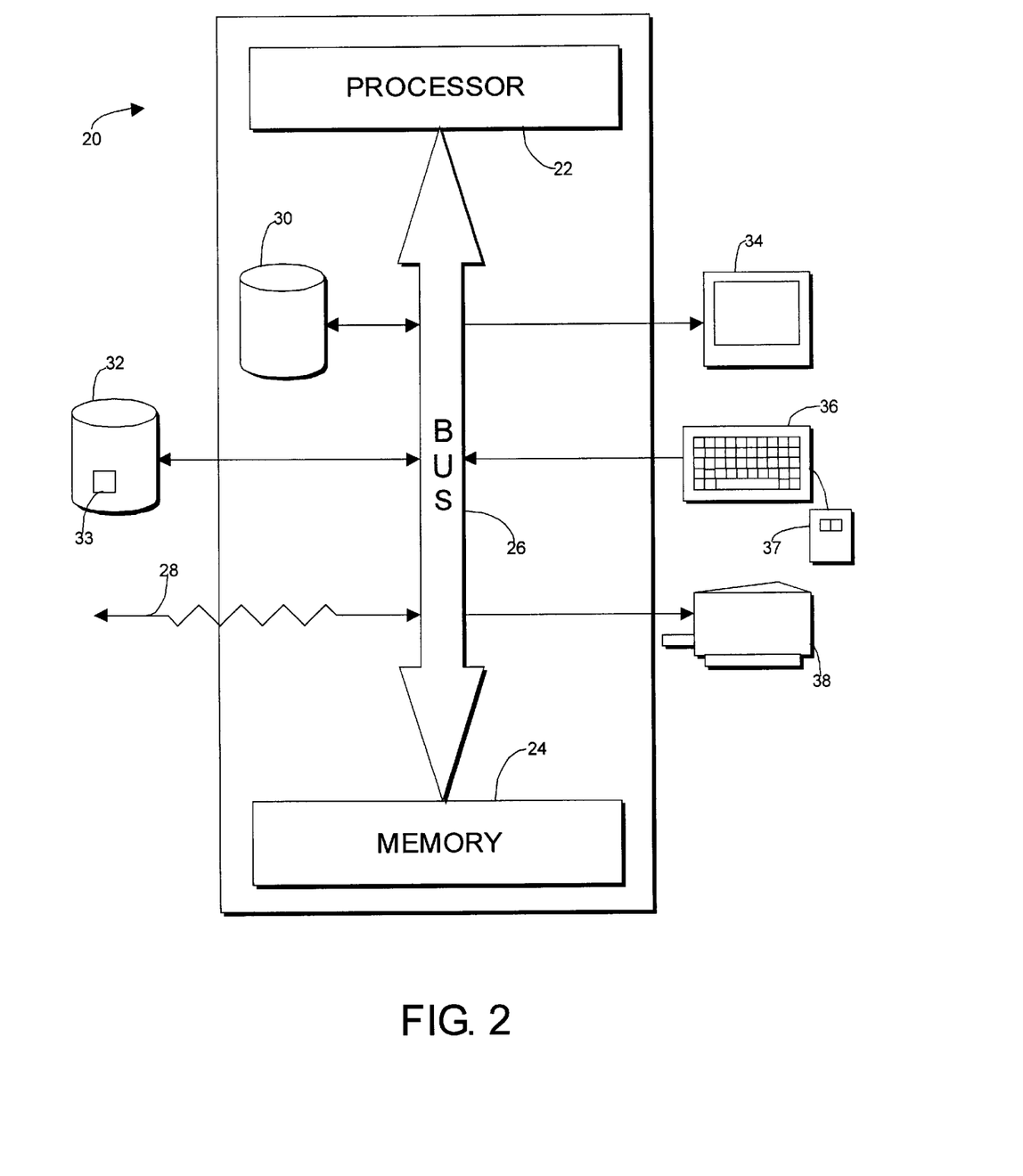
FIG. 2 is a block diagram illustrating a General Purpose Computer such as used to implement the database server, intermediate system, and enduser systems, shown in FIG. 1.

FIG. 2 is a block diagram illustrating a General Purpose Computer 20 such as used to implement the database server 60, intermediate system 62, and end-user systems 64, 66, 68 shown in FIG. 1. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such the Web database access program 80, the Web forms program 82 on the database server 60, and the GEAP program and Internet Web Browser 86 on the intermediate system 62 and user systems 64, 66, 68, and other user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution. The enterprise level user database 72, the HTML template forms database 70, the local forms database 74, and user data 76 are typically stored in Non-Volatile Memory such as Secondary Storage 30.

FIG. 3 is a flow chart that illustrates operation of a Web server application 80 executing on the server 60 shown in FIG. 1. A request is received by the Web database access program 80 either directly from a Web browser 86, or indirectly via the GEAP program 84. A test is made whether the request was from a GEAP program 84, or from some other source, such as directly from a Web browser 86, step 102. If the request was from a GEAP program 84, step 102, an HTML header that starts with "text/geapform" and contains a GEAP forms number is transmitted to the GEAP program, step 104. Otherwise, a standard "text/html" HTML Web page header is transmitted, step 106. In either case, standard processing is performed, step 108. This will typically entail performing database queries to the enterprise level database 72. The results from the database query are then transmitted to the system making the request, step 110. In the preferred embodiment, this is done by transmitting an HTML script initializing variables for each of the values being transmitted. These operate as global or external variables for the remainder of the HTML text. When all of the values have been transmitted, a test is again made whether in "GEAP" or "efficient" mode, step 112. If not in GEAP mode, step 112, the appropriate HTML form is retrieved from the HTML forms database 70 and transmitted to the requesting system. In the preferred embodiment, the form contains static HTML that does not need to be parsed and interpreted by the Web server application 80 executing on the server 60. Rather, it can be directly transmitted to the requesting system as expeditiously as possible. The Web server application 80 is then complete. The result of the method shown in this FIG. is that a single Web server application 80 can be used to support both standard and GEAP or efficient access. This provides significant program maintenance advantages over the prior art.

Figure 4:
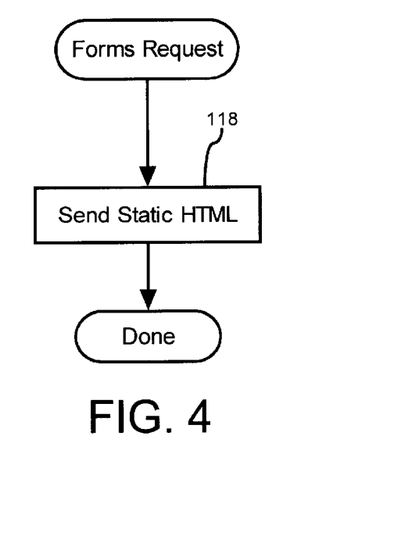
FIG. 4 is a flow chart that illustrates operation of a Web forms application executing on the server shown in FIG. 1.

FIG. 4 is a flow chart that illustrates operation of a Web forms application 82 executing on the server 60 shown in FIG. 1. A request for a specific HTML form is received. The HTML form is read from the HTML forms database 70 and transmitted as static HTML to the requesting GEAP program 84, step 118. In the preferred embodiment, the HTML forms are stored in an HTML database 70. In the preferred embodiment, a single version of a given form is retained. However, in an alternate embodiment, multiple versions of a given HTML form can be maintained in the local forms database 74. The GEAP program 84 will request the specific version of any form for which it receives data from the server that it doesn't already have a copy of in its local forms database 74. As noted above, the form and version number are specified in the "text/geapform" HTML header 154 (see FIG. 8) transmitted from the server 60 in step 104 in FIG. 3. In the preferred embodiment, the version number is utilized to identify when a form has been updated, and is only downloaded and saved when the version number requested does not match the version saved. Also note (see Attachment #2) that in the preferred embodiment, the version specified is in the form of a date and time, which indicates when the form was last updated.

Figure 5:
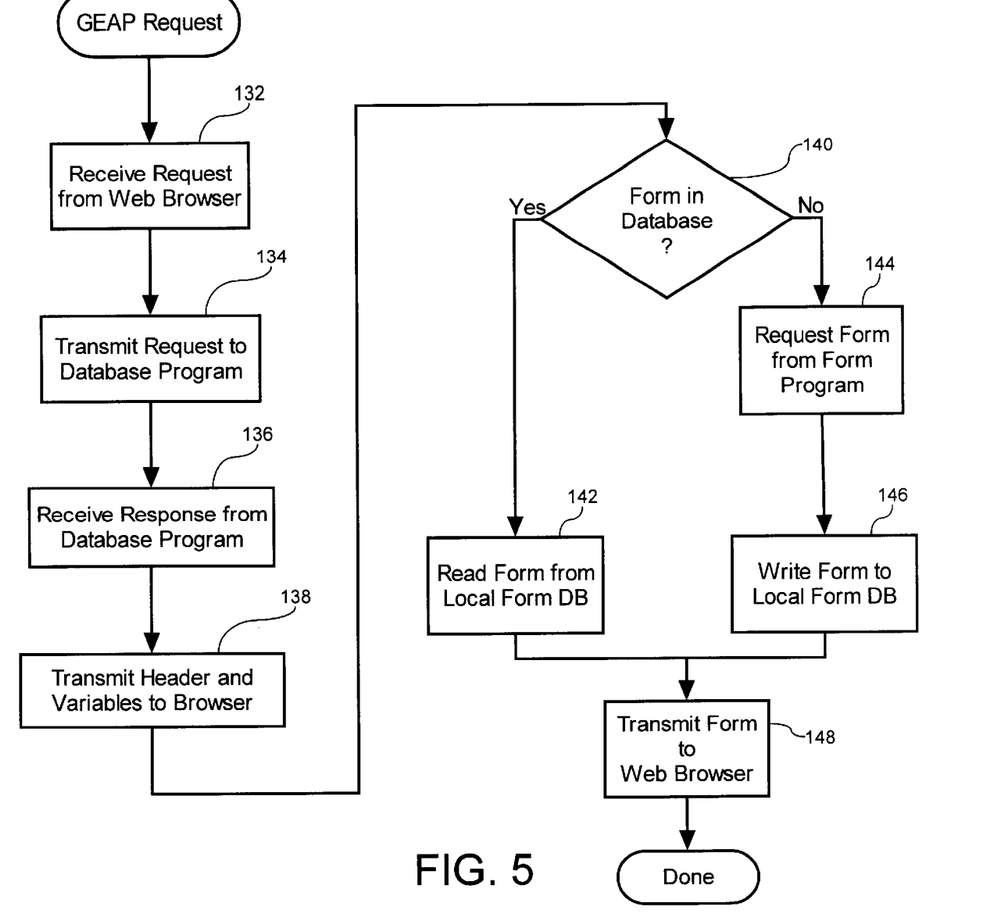
FIG. 5 is a flowchart illustrating operation of the GEAP program as shown in FIG. 1.

FIG. 5 is a flowchart illustrating operation of the GEAP program 84 as shown in FIG. 1. The GEAP program 84 receives a query from a Web browser 86, step 132. Note that the GEAP program 84 may be located on a separate computer system 62, or on the same computer system 66 as the Web browser 86. By using sockets in conjunction with TCP/IP, the location of the GEAP program is transparent both to the GEAP program 84 and to the Web browser 86. The query or request is transmitted to the database program 80, step 134. The query is marked as originating from the GEAP program 84. After being processed by the Web database query program 80 on the server 60, a response is received by the GEAP program 84, step 136. A standard HTML header is transmitted to the Web browser 86, followed by the appropriate text, step 138. The header received from the server 60 will contain a GEAP header instead of a standard HTML header. This GEAP header will contain a form identifier and version number. A search is made of the local forms file 74 for the specified version of the form, step 140. If the specified version of the form is in the forms database 74, it is read from the local forms database 74, step 142. Otherwise, a request is sent to the Web forms program 82 on the server 60 for the specified version of the specified form, step 144. When the specified version of the specified form is received from the server 60, it is written to the local forms database 74, step 146. In any case, the specified version of the specified form is then transmitted to the Web browser 86, step 148, and the processing is complete. It should be noted that though the GEAP program 84 is shown herein requesting and receiving database queries without the corresponding HTML text (see FIG. 8), in the preferred embodiment GEAP 84 also supports receipt of full HTML (see FIG. 7). The program distinguishes between the two types of information through the HTTP headers 152, 154.

Figure 6:
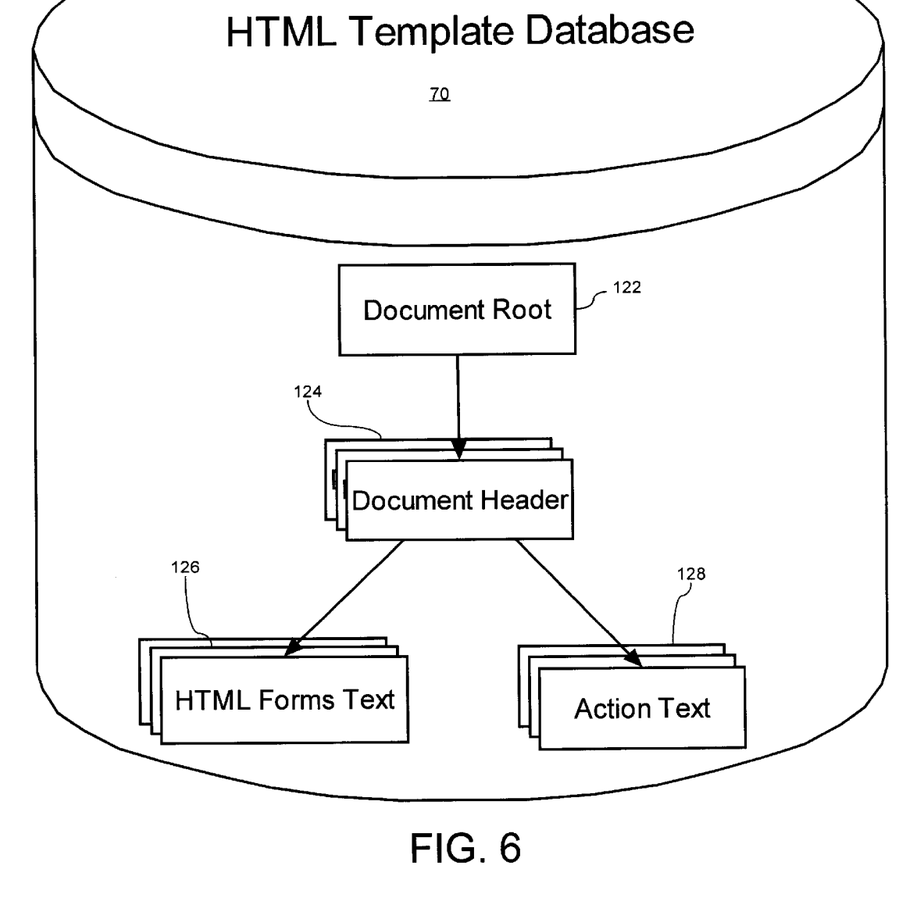
FIG. 6 is a diagram illustrating the HTML Data Base shown in FIG. 1.

FIG. 6 is a diagram illustrating the HTML Data Base 70 shown in FIG. 1. In the preferred embodiment, the HTM Data Base 70 is a network database. However, it can be stored in other file organizations, including as hierarchical or relational databases. In the case of database administration tools, accessing the HTML Data Base 70 starts with a Document Root record 122. This record points to a plurality of Document Header records 124. This structure allows a utility to search all Document Header records 124. Each Document Header record 124 represents a single form. The correct Document Header record 124 is typically identified by a key containing the form name, as supplied in the GEAP HTML header 154 (see FIG. 8). User programs typically hash directly to the desired Document Header record 124 using the requested form name as the hash key. Linked to the Document Header records 124 are HTML Forms Text records 126 containing static HTML text and Action Text records 128 containing active text requiring server processing. Separating the static HTML text from active text allows routines accessing the HTML Data Base 70 in response to queries to be optimized since the static HTML text can be transmitted without being interpreted.

As noted above, the preferred embodiment supports a single form of any given name. However, the HTTP/GEAP protocol supports multiple versions of a given form name. One implementation of this in an HTML Data Base 70 is to include both the form name and the form version in the Document Header record 124. An alternate implementation chains version records (not shown) to the Document Header records 124, with one version record per document version. The HTML forms text records 126 and the Action Text records 128 would then be chained to their corresponding version record. Other implementations are also within the scope of this invention.

Figure 7:
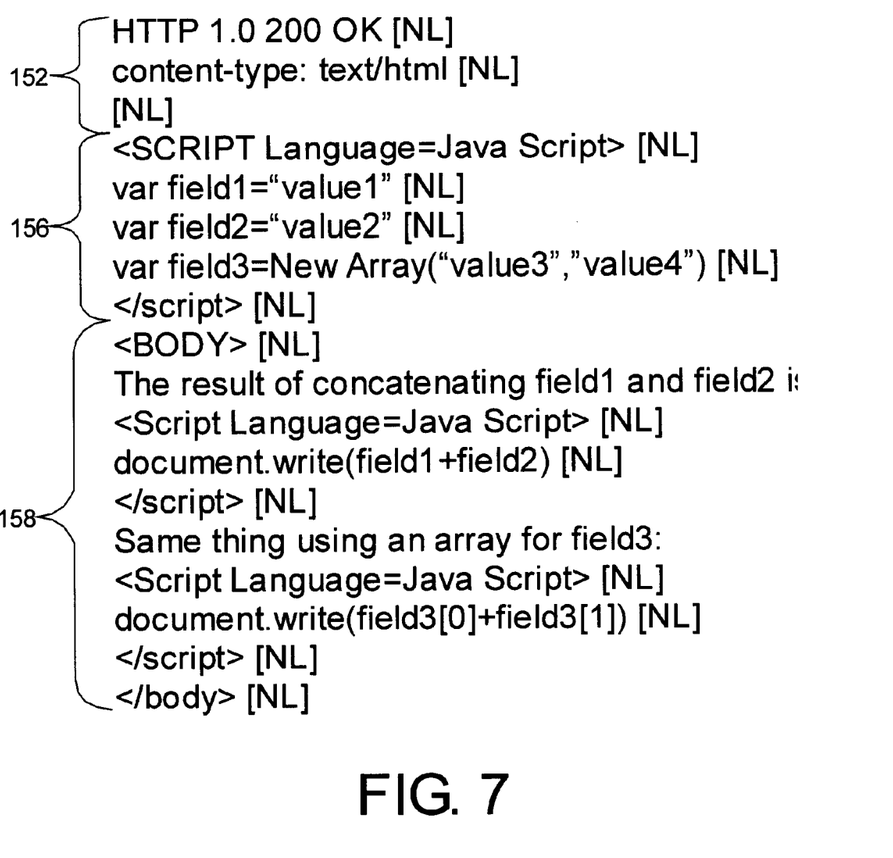
FIG. 7 is a diagram illustrating an example HTML file as transmitted by the Web database access program when not in GEAP mode, in accordance with the present invention.

FIG. 7 is a diagram illustrating an example HTML file as transmitted by the Web database access program 80 when not in GEAP mode. The HTML can be broken into three segments. First, there is the header 152. This indicates that the file transmitted contains standard HTML. This is indicated by the "content-type:text/html" line. This is a sample of the text transmitted in step 106 in FIG. 3. This is followed by query results 156, as shown in step 110 of FIG. 3. In this example, the query results 156 are generated in the form of Java script. Within the Java script, Java variables are initialized to values. These variables and values correspond to the actual query results. The query results 156 are followed by static HTML 158, as transmitted in step 114 in FIG. 3. The static HTML 158 typically contains page formatting. It utilizes the variables initialized in the query results 156, step 110. It should be noted here that the separation of the query results 156 from the static HTML 158 allows the Web database access program 80 to transmit the static HTML 158 efficiently, without the need to interpret it on a byte-by-byte basis. Also, this provides the ability to change the content of a Web page without the necessity of recompiling the Web database access program 80. Attachment #1 is a more extensive example of a full HTML response to a query when not in GEAP mode.

Figure 8:
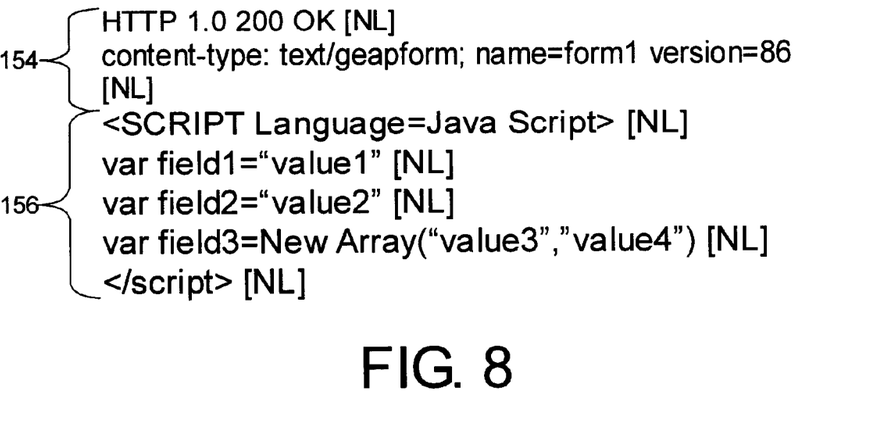
FIG. 8 is a diagram illustrating an example GEAP file as transmitted by the Web database access program when in GEAP mode, in accordance with the present invention.

All static HTML is supported in this manner. HTML protocol requires that blocks start with a <block> type format, and are terminated by a </block> type format. This protocol is shown with both <SCRIPT> and <BODY> types of blocks, but applies to other types of HTML blocks. In FIGS. 7 and 8, a "new line" line terminator is shown at the end of each line as "[NL]". Different architectures utilize different line termination sequences. For example, IBM type Personal Computers (PCs) utilize a Carriage Return ("CR") followed by a Line Feed ("LF") for this functionality. The "new line" is not shown in Attachments #1 and #2, but is rather implied by the end of each line. One exception to this convention in Attachment #2 is the bolded "content-type:" line that is shown as two lines of text. Instead, in actual text, the two lines are actually combined into a single line. Two lines are shown in Attachment #2 since printed text has a finite line length limit, a limit that does not apply to actual HTML/HTTP text.

FIG. 8 is a diagram illustrating an example GEAP file as transmitted by the Web database access program 80 when in GEAP mode. The transmitted GEAP text can be broken into two segments. First, there is the header 154. This indicates that the file transmitted contains GEAP text. This is indicated by the "content-type:text/geapform" line. This is a sample of the text transmitted in step 104 in FIG. 3. Note that the name of the form and its corresponding version is also specified on the "content-type" statement. This is utilized by the GEAP program 84 to determine which form to utilize, and if not present in the local forms database 74, which form to request from the Web forms program 82 for download from the server 60. The GEAP header 154 is followed by query results 156, as shown in step 110 of FIG. 3. The query results 156 are output in the form of Java script. Within the Java script, Java variables are initialized to values. These variables and values correspond to the actual query results. Attachment 2 is a further example of a response to a query by a GEAP 84 program corresponding to the example in Attachment #1.

Note that the static HTML 158 is not transmitted when communicating with a GEAP program 84. Rather, the static HTML 158 is transmitted by the Web forms program 82 on the server 60 upon request by the GEAP program 84 and stored for later use in a forms database 74 on the computer system 62, 66 executing GEAP 84. This results in a significant reduction in communications bandwidth, and a corresponding increase in response time and performance.

In the prior art, HTML pages and forms are stored in files in a UNIX or PC type of tree file structure. One problem with this approach is that traversing such a tree file structure requires typically requires a number of file opens and closes as the tree file structure is traversed. At each level of the tree, a file is opened and searched for the next level in the tree. Then, that file is closed, and the file at the next level is opened and read. This proceeds through directory nodes until the file containing the HTML is encountered. This file is then opened, read, and closed. These file opens, closes, and accesses require significant numbers of I/O accesses. This overhead has typically been overcome in the prior art by server replication.

This type of solution however is less useful when dealing with enterprise level databases. This is because in accessing enterprise level databases, server 60 replication is often not realistic. In the preferred embodiment this problem is solved by storing the HTML pages as records in an HTML forms database 70. Once the HTML forms database 70 has been opened, it can stay open through multiple HTML page retrievals. This eliminates a number of I/Os. Additionally, the HTML forms database 70 can be designed utilizing modem database concepts so that most HTML forms can be retrieved in a single I/O. The result of this technique is to significantly reduce the number of I/Os necessary to retrieve an HTML page. This in turn results in a significant reduction in the amount of resources required for each Web request of the server 60, and a corresponding increase in server 60 throughput.

As noted above, HTML pages are stored as records in an HTML forms database 70 in the preferred embodiment.

Other types and organizations of HTML forms files are within the scope of this invention. In one alternate embodiment, HTML pages are stored in program files or partitioned datasets. In these types of file organization, the number of I/Os needed to access a specified page of HTML is typically higher than the comparable figure for databases, but lower than the comparable figure for system standard file. In another alternate embodiment, when the number of I/Os required for accessing HTML pages is not a critical performance constraint, HTML pages are stored in system standard files.

The HTML forms database 70 and the enterprise level user database 72 are network type databases in the preferred embodiment. Other types of databases are within the scope of this invention. In one alternate embodiment, the databases 70, 72 are relational databases. In another alternate embodiment, the databases 70, 72 are hierarchical databases.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of providing a formatted response to a query from a destination system,
    wherein said method comprises:
        A) determining whether to proceed in a first mode of operation or a second mode of operation, wherein:
            the first mode of operation is a standard mode of operation, and
            the second mode of operation is an efficient mode of operation;
        B) transmitting a first header to the destination system when in the first mode of operation, wherein:
            the first header is a standard mode of operation header;
        C) transmitting a second header to the destination system when in the second mode of operation wherein:
            the second header is an efficient mode of operation header;
        D) after transmitting either the first header in step (B) or the second header in step (C), transmitting a common response to the destination system; and
        E) after transmitting the first header in step (B), transmitting a form to the destination system when in the first mode of operation.

2. The method in claim 1 which further comprises:
    F) performing a database access to an application database in order to format the common response transmitted in step (D).

3. The method in claim 2 wherein:
    the application database is an enterprise level database.

4. The method in claim 2 wherein:
    the application database is a relational database.

5. The method in claim 2 wherein:
    the application database is a network database.

6. The method in claim 1 which further comprises:
    F) retrieving the form from a forms database prior to transmitting the form in step (E) when in the first mode of operation.

7. The method in claim 6 wherein:
    the forms database is a relational database.

8. The method in claim 6 wherein:
    the forms database is a network database.

9. The method in claim 1 wherein:
    the second header identifies the form.

10. The method in claim 1 wherein:
    a combination of the first header, the common response, and the form comprise an HTML page displayable by a Web browser.

11. A data processing system having a first server system providing a formatted response to a query,
    wherein said first server system comprises:
        a means for providing communications;
        a processor; and
        a computer software storage medium containing a first set of computer instructions for execution by the processor, said first set of computer instructions comprising:
            A) a set of computer instructions for determining whether to proceed in a first mode of operation or a second mode of operation, wherein:
                the first mode of operation is a standard mode of operation, and
                the second mode of operation is an efficient mode of operation;
            B) a set of computer instructions for transmitting a first header over the means for providing communications when in the first mode of operation, wherein:
                the first header is a standard mode of operation header,
            C) a set of computer instructions for transmitting a second header over the means for providing communications when in the second mode of operation, wherein:
                the second header is an efficient mode of operation header,
            D) a set of computer instructions for transmitting a common response over the means for providing communications after transmitting either the first header in set (B) or the second header in set (C) over the means for providing communications, and
            E) a set of computer instructions for transmitting a form to the destination system when in the first mode of operation after transmitting the first header in set (B) over the means for providing communications.

12. The data processing system in claim 11 wherein said first set of computer instructions further comprises:
    F) a set of computer instructions for performing a database access to an application database in order to format the common response transmitted in set (D).

13. The data processing system in claim 12 wherein the first server system further comprises:
    a non-volatile memory containing the application database.

14. The data processing system in claim 11 wherein said first set of computer instructions further comprises:
    F) a set of computer instructions for retrieving the form from a forms database prior to transmitting the form in set (E) when in the first mode of operation.

15. The data processing system in claim 14 wherein the first server system further comprises:
    a first non-volatile memory containing the forms database.

16. The data processing system in claim 15 wherein:
the forms database is a relational database.

17. The data processing system in claim 15 wherein:
the forms database is a network database.

18. The data processing system in claim 15 wherein said first set of computer instructions further comprises:
  G) a set of computer instructions for performing a database access to an application database in order to format the common response transmitted in set (D).

19. The data processing system in claim 18 wherein the first server system further comprises:
  a second non-volatile memory containing the application database.

20. The data processing system in claim 11 which further comprises:
  a second server system for providing a specified form in response to a form request, wherein said second server system comprises:
    a means for providing communications;
    a processor;
    a non-volatile memory containing a forms database; and
    a computer software storage medium containing a second set of computer instructions for execution by the processor, said second set of computer instructions comprising:
      A) a set of computer instructions for reading the specified form from a second forms database;
      B) a set of computer instructions for transmitting the specified form across the means for providing communications.

21. The data processing system in claim 20 wherein:
the first server system and the second server system are distinct systems.

22. The data processing system in claim 20 wherein:
the first server system and the second server system are the same system.

23. The data processing system in claim 22 wherein said first set of computer instructions further comprises:
  F) a set of computer instructions for retrieving the form from the forms database prior to transmitting the form in set (E) when in the first mode of operation.

24. The data processing system in claim 23 wherein said first set of computer instructions further comprises:
  G) a set of computer instructions for performing a database access to an application database in order to format the common response transmitted in set (D).

25. The data processing system in claim 24 wherein the first server system further comprises:
  a second non-volatile memory containing the application database.

26. The data processing system in claim 11 wherein:
said data processing system further comprises:
  a communications link utilizing an essentially connectionless protocol coupled to the first server, and
wherein:
  the means for providing communications transmits data over the communications link.

27. The data processing system in claim 26 wherein:
the essentially connectionless protocol is TCP/IP.

28. The data processing system in claim 11 wherein:
said data processing system further comprises:
  a first communications link utilizing a session oriented protocol coupled to the first server, and
wherein:
  the means for providing communications transmits data over the first communications link.

29. The data processing system in claim 28 wherein:
the session oriented protocol is a SNA protocol.

30. The data processing system in claim 28 wherein:
the session oriented protocol is a DSA protocol.

31. The data processing system in claim 11 wherein:
said data processing system further comprises:
  a communications server coupled to the first communications link, and
  a second communications link utilizing an essentially connectionless protocol coupled to the communications server,
wherein:
  the communications server translates session oriented communications over the first communications link to essentially connectionless communications over the second communications link, and
  the communications server translates essentially connectionless communications over the second communications link to session oriented communications over the first communications link.

* * * * *